United States Patent [19]

Kashyap et al.

[11] Patent Number: 4,923,278

[45] Date of Patent: May 8, 1990

[54] TEMPERATURE DESENSITIZATION OF DELAY IN OPTICAL FIBRES

[75] Inventors: Raman Kashyap; Michael H. Reeve; Stephen A. Cassidy; Stephen Hornung, all of Ipswich, England

[73] Assignee: British Telecommunications public limited company, Great Britain

[21] Appl. No.: 32,964

[22] Filed: Mar. 31, 1987

Related U.S. Application Data

[63] Continuation of Ser. No. 752,109, filed as PCT GB84/00354 on Oct. 19, 1984, published as WO85/01802 on Apr. 25, 1985, abandoned.

[30] Foreign Application Priority Data

Oct. 21, 1983 [GB] United Kingdom ................. 8328204

[51] Int. Cl.$^5$ .............................................. G02B 1/10
[52] U.S. Cl. ................................ 350/96.30; 350/96.23; 350/96.33; 350/96.34
[58] Field of Search ............... 350/96.23, 96.29, 96.30, 350/96.31, 96.33, 96.34; 525/128, 126, 125

[56] References Cited

U.S. PATENT DOCUMENTS

| | | | |
|---|---|---|---|
| 3,980,390 | 9/1976 | Yamamoto et al. | 350/96.34 X |
| 4,410,683 | 10/1983 | Gale | 528/125 |
| 4,417,782 | 11/1983 | Clarke et al. | 350/96.29 |
| 4,482,205 | 11/1984 | Lagakos et al. | 350/96.34 |
| 4,515,435 | 5/1985 | Anderson | 350/96.23 |
| 4,553,815 | 11/1985 | Martin | 350/96.23 |
| 4,778,244 | 10/1988 | Ryan | 350/96.23 |

FOREIGN PATENT DOCUMENTS

| | | |
|---|---|---|
| 0064789 | 11/1982 | European Pat. Off. . |
| 0076575 | 4/1983 | European Pat. Off. . |
| 91253 | 10/1983 | European Pat. Off. . |
| 129372 | 12/1984 | European Pat. Off. . |
| 3108109 | 9/1982 | Fed. Rep. of Germany ... 350/96.23 |
| 52-38236 | 3/1977 | Japan ................................. 350/96.30 |

OTHER PUBLICATIONS

Applied Optics, vol. 21, No. 12, Jun. 1982, P. Shajenko: "Remote Sensing with White Light", p. 2095.

Journal of Optical Communications, vol. 3, No. 4, Dec. 1982, K. Mansuno et al., "Optimum Design of Coated Optical Fiber Considering Excess Loss at Low Temperatures", pp. 142–145.

Hughes et al., "Thermally Induced Optical Phase Effects in Fiber Optic Sensors", *Applied Optics*, vol. 19, No. 9, May 1980, pp. 1477–1483.

Jackson et al., "Elimination of Drift in a Single-Mode Optical Fiber ... ", *Applied Optics*, vol. 19, No. 17, Sep. 1980, pp. 2926–2929.

Lagakos et al., "Minimizing Temperature Sensitivity of Optical Fibers", *Applied Optics*, vol. 20, No. 19, Oct. 1981, pp. 3276–3278.

Primary Examiner—John D. Lee
Attorney, Agent, or Firm—Nixon & Vanderhye

[57] ABSTRACT

An optical fibre has a coating of, for example, liquid crystal polymer which causes temperature-dependent stress-induced changes in the optical fibre such as to counteract temperature-induced changes in the transmission delay of the fibre.

29 Claims, 3 Drawing Sheets

TEMPERATURE DESENSITIZATION OF DELAY IN OPTICAL FIBRES

This is a continuation of application Ser. No. 752,109 filed as PCT GB84/00354 on Oct. 19, 1984, published as WO85/01802 on Apr. 25, 1985, now abandoned.

FIELD OF THE INVENTION

This invention relates to optical waveguides, and in particular though not exclusively to optical fibres and coatings for optical fibre waveguides.

BACKGROUND AND SUMMARY OF THE INVENTION

Optical waveguides generally comprise an optical guiding region of a refractive index $n_1$, embedded in material of a refractive index $n_2$ where usually $n_2 < n_1$. It should be observed that the guiding region as well as the bedding material may themselves be structured by having two or more regions of different refractive indices, as illustrated by numerous known designs of optical fibres.

It is well known that optical fibres of the kind used in optical communications and for optical fibre sensors, for example, are usually covered with a protective coating to protect the fibre surface from mechanical and chemical damage.

It is known also to reduce temperature dependence of transmission losses of an optical fibre by application to the fibre of an appropriate coating. For example, published European patent application EP-A-0076575 ("Optical fibre insensitive to temperature variations", Hughes Aircraft Company) discloses an optical fibre suitable for operation at high temperatures. According to the disclosure in EP-A-0076575 the temperature dependence of transmission losses, i.e. attenuation of optical signals passing through the fibre, at high operating temperatures is reduced by applying a metal coating to the fibre and annealing. The coating, which may be aluminium or another metal or a metal alloy, is applied to the fibre by pulling the fibre through a melt bath, for example, and the fibre so coated is then annealed at a temperature of several hundred degrees Celsius. It is stated in EP-A-0076575 that, provided the annealing temperature is sufficiently high for the transmission losses through the fibre to be much the same as those at room temperature, the temperature dependence of the transmission loss is substantially eliminated over a range of temperatures from $-200°$ C. to $560°$ C.

The effect of temperature variations on the transmission loss of optical fibres is considered also in "Optimum Design of Coated Optical Fibres Considering Excess at Low Temperature", K Masuno and K Ishihara, J Opt. Comm., 3(1982) 4, pp 142–145. The effect of temperature variations on transmission loss is considered with reference to optical fibres coated with a nylon coating, and it is suggested that temperature dependence of transmission loss at low temperatures can be kept very low by employing nylon coatings with a linear thermal coefficient of expansion of the order of $10^{-5°}$ C.$^{-1}$.

It is an object of the present invention to reduce temperature dependence of transmission delay in optical waveguides.

According to one aspect of the present invention a method of reducing temperature dependence of transmission delay in an optical waveguide comprises attaching the waveguide to stressing means arranged to apply to the optical waveguide a temperature dependent stress such that changes in transmission delay induced by the applied stress counteract the temperature induced delay changes.

According to another aspect of the present invention an optical waveguide assembly comprises an optical waveguide and attached to the optical waveguide stressing means capable of applying temperature dependent stress to the attached waveguide such that changes in transmission delays induced by the applied stress counteract temperature induced delay changes therein.

The optical waveguide is conveniently an optical fibre. Alternatively, the optical waveguide may, for example, comprise an optical waveguide structure in which the guiding region is embedded in a planar substrate, such as for example, a LiNbO$_3$ (lithium niobate) thin film waveguide structure.

The stressing means may be attached to the waveguide at discrete spaced positions, or may be in intimate contact with the waveguide or with an intermediate material itself attached to the waveguide.

The attachment between waveguide and stressing means may be solely by way of friction, or may be by means of, for example, an adhesive compound.

Preferably the stressing means comprises a sleeve about the waveguide.

Alternatively the stressing means may, for example, be a support member such as, for example, a strength member of an optical fibre cable.

In a preferred embodiment of the present invention the optical waveguide comprises an optical fibre, and the stressing means comprise a sleeve forming a jacket tightly fitting around the optical fibre or at least part of the length thereof.

Temperature-induced changes in transmission delay in for example, an optical fibre are caused by a combination of changes in the length of the fibre and in the refractive index of the fibre. These changes in transmission delay are counteracted in accordance with the present invention by strain in, and/or changes in the refractive index of, the fibre which result from the applied stress. The jacket may be chosen such that the changes in transmission delays caused by the action of the jacket counteract the thermally induced changes to such a degree as to substantially compensate therefor.

In a further preferred form of the present invention the optical fibre is of a material composition and structure such that the coefficient of linear thermal expansion of the fibre determines the overall change in the transmission delay, and the jacket comprises material having a coefficient of linear thermal expansion opposite to that of the fibre.

In a yet further preferred form, the present invention comprises an optical fibre having a positive coefficient of linear thermal expansion, and a jacket of a material having a negative coefficient of linear thermal expansion.

The jacket may conveniently be formed of a liquid crystalline polymer. The polymer may be extruded onto the optical fibre.

The present invention may be employed, for example, to provide a substantially temperature independent optical path length reference.

Thus, optical fibres are known to be useful, for example, as interferometric sensor elements owing to their inherent sensitivity to changes in temperature, strain, pressure and electric current and magnetic field. However most of these measurements in sensing require the ability to distinguish between the parameter being sensed and the other influences which may have a similar effect on the sensing properties of the fibre. This is often achieved by using a reference fibre which is subjected to the same influences as the sensing fibre, except for the one parameter to be measured. This requires careful layout in the design of the sensor. Some control element is also included in the reference arm to keep track of the drift induced by differential effects, especially when temperature is a noise source.

The present invention overcomes or at least mitigates some of these problems by providing inter alia an optical fibre which is coated with a material which has the effect of de-sensitizing the optical delay in the fibre with respect to changes in temperature.

BRIEF DESCRIPTION OF THE DRAWINGS

The present invention will now be described further with reference to a theoretical model, and by way of example with reference to the accompanying drawings of which.

DETAILED DESCRIPTION

Figure 1:
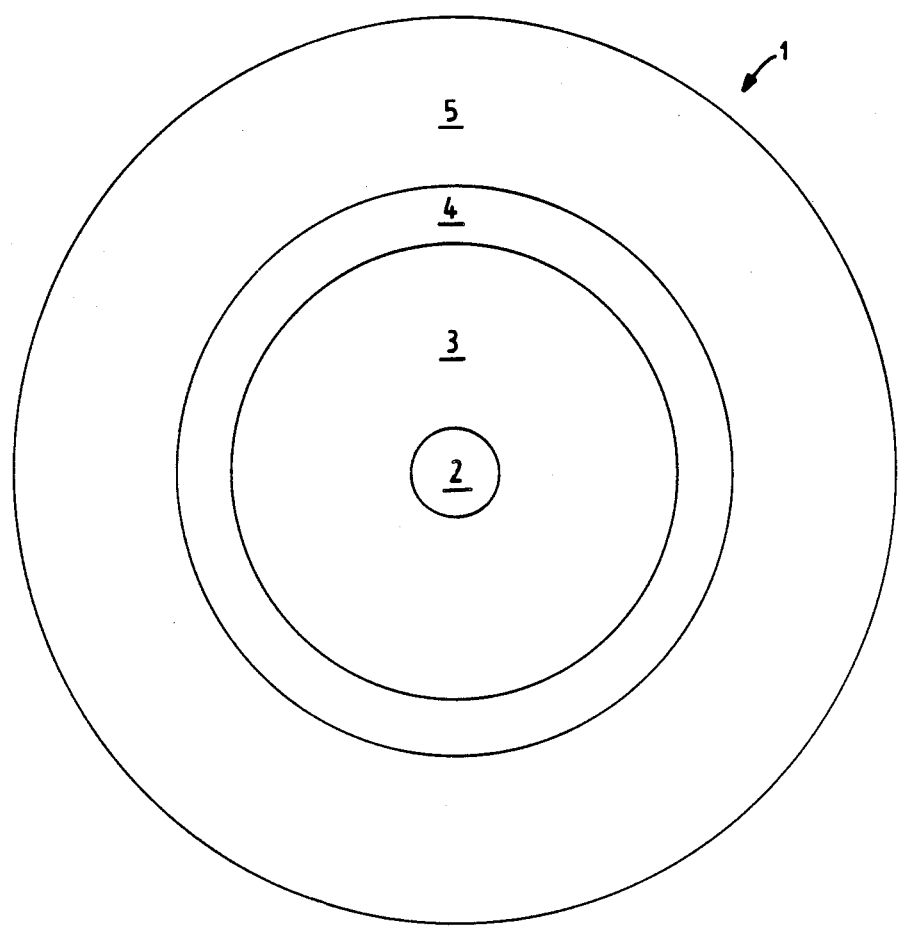
FIG. 1 is a schematic cross-section through a coated optical fibre.

Referring first to FIG. 1, an optical fibre 1 comprises a core 2 embedded in a cladding 3, and applied to the primary coating 4 a coating 5 forming a tightly fitting jacket to the optical fibre 1. The coating 5 which may be applied for example to a primary coating 4, as shown, or directly to the surface of the cladding 3, serves at least to counteract, or even to substantially compensate for, any temperature-induced changes in the transmission delay in the optical fibre 1.

The properties required of the coating material, and the coating in general, will become apparent from a brief outline of the theoretical background. Taking the example of optical fibre sensing devices, sensing in optical fibres is possible as a result of the change in the optical path length, 1 due to some influencing condition such as a change in temperature. This has the effect of altering the group index, N, as well as the physical length of the fibre, L. The delay in a fibre can be represented by, $$t = \frac{NL}{c} \quad (1)$$

where c is the speed of light and $l = NL$.

When the temperature T changes, the delay is altered and the sensitivity to change is then given by, $$\frac{dt}{dT} = \frac{1}{c}\left(\frac{NdL}{dT} + \frac{LdN}{dT}\right) \quad (2)$$

The change in group index and the length can be either additive or substractive. The length change is dependent on the thermal expansion coefficient of the fibre which is large for borosilicate glasses ($\sim 10^{-5}$) and small for silica fibres ($\sim 10^{-6}$). The net value is generally positive with respect to temperature.

However, when a fibre is strained, it can be shown that the change in optical delay with respect to strain is given by the relation, $$\frac{dt}{d\sigma} = \frac{1}{c}\left(\frac{NdL}{d\sigma} + \frac{LdN}{d\sigma}\right) \quad (3)$$

where $\sigma$ is the stress induced in the fibre. In this equation, the two terms within the brackets have opposite signs and hence the overall effect is slightly reduced. However, the total effect is positive for an increase in stress.

The reader should now consider this fibre when coated with a material which has a coefficient of linear expansion opposite to that of the fibre. When the fibre is subjected to a temperature change, two effects will occur. One will be the strain induced by length change as the net result of the competing coefficients of thermal expansions of the fibre and coating. The other effect will be the change in delay due to the change in the group index, N, as a result of the strain effect and because of the temperature dispersion of N. It can be seen that with the appropriate choice of coating material, the overall change in optical delay with respect to temperature can be reduced to zero. It can be shown by analysis of the composite structure of fibre and coating, that $$\frac{dt}{dT} = t\left[K + \frac{1dN}{NdT} + \frac{E_f}{N}\frac{dN}{d\sigma}(K - \alpha_f)\right] \quad (4)$$

where, $E_f$ is the Young's modulus of the fibre, $\alpha_f$ its linear expansion coefficient and $$K = (A_c E_c \alpha_c + A_f E_f \alpha_f)/(A_c E_c + A_f E_f) \quad (5)$$

Here, the subscripts "c" and "f" refer to the coating and fibre respectively. A is the cross-sectional area, E is Young's modulus, and $\alpha$, the thermal expansion coefficient.

Using equations 4 and 5, we arrive at the thermal expansion coefficient of the coating to be:

$$\alpha_c = (1 + K_f/K_c)\left[\frac{1dt}{tdT} + \frac{E_f}{N}\alpha_f\frac{dN}{d\sigma} - \frac{1dN}{NdT}\right]/\left(1 + \frac{E_f}{N}\frac{dN}{d\sigma}\right) - \frac{K_f}{K_c}\alpha_f \quad (6)$$

where $K_c = A_c E_c$ and $K_f = A_f E_f$. For zero temperature sensitivity, $$\frac{dt}{dT} = 0.$$

Using typical values for single-mode silica fibre and using parameters of the coating as outlined in table 1, we arrive at the required thermal expansion coefficient of the coating to be approximately $-9 \times 10^{-6}$.

A tight extrusion coating package was made for sodium boro-silicate multimode and silica monomode optical fibres using an oriented thermotropic liquid crystal polyester with a modulus of around 20 $GNm^{-2}$. These polymers are also called "self reinforcing" and the polymer used is a co-polyester containing 73 mole % p-oxybenzoyl and 27 mole % 6-oxy-2 naphthnoyl. This polymer possesses an ordered melt state which can be rearranged by shear and elongational melt flow during extrusion coating. Using this property the extrusion conditions can be tailored to give a range of polymer moduli and thermal expansion coefficients. Typical conditions give high moduli (20 $GNm^{-2}$), and low thermal expansion coefficient ($5 \times 10^{-6}$) when compared to conventional polymers.

The fibres (two samples of graded index sodium borosilicate multimode and two samples of silica monomode) were 125 $\mu m$ in diameter with a silicone rubber coating bringing the total diameter to 250 $\mu m$. They were coated using a conventional 19 mm single-screw extruder. The key parameter in determining the degree of polymer orientation induced by the extrusion process is the draw ratio, given by the ratio of the cross-sectional area of the die to the cross-sectional area of the coating. For example, for sample 1 a 1 mm die was used and the line was run with the extrusion rate equal to the haul-off rate, allowing the coating diameter to remain at 1 mm. This limits the orientation process giving low values of both $\alpha$ and E. In contrast, for sample 2, a larger (2 mm) die was used and the still molten polymer was pulled down after extrusion. This increases the degree of orientation, and hence the resultant larger values of $\alpha$ and E. The extrusion conditions allow the alteration of the $\alpha_c$ from a small negative to a small positive value. The coefficients of linear expansion have been measured as follows:

| Sample No. | Strain | Dia. | Line Speed | Die Dia. | $\alpha*10^{-6}$ | E |
|---|---|---|---|---|---|---|
| Sodium Borosilicate multimode fibre | | | | | | |
| 1. | 0.30% | 1.0 mm | 17.5 m/s | 1 mm | −2.3 | 13.0 $GNm^{-2}$ |
| 2. | 0.29% | 1.0 mm | 22.0 m/s | 2 mm | −6.3 | 26.5 $GNm^{-2}$ |
| Silica Monomode fibre | | | | | | |
| 3. | 0.05% | 0.9 mm | 10.0 m/s | 2 mm | −3.7 | 21.1 $GNm^{-2}$ |
| 4. | 0.09% | 2.0 mm | 1.0 m/s | 2 mm | — | 9.7 $GNm^{-2}$ |

It is immediately apparent that there is a very high level of strain locked into the sodium borosilicate glass fibre samples, and a very low level in the silica fibre. This is caused by the difference in $\alpha$-values of the borosilicate and silica glasses ($10^{-5}$ and $5*10^{-7}$ respectively) compared to the $\alpha$-value of the polymer. The polymer is deposited on fibre heated and expanded by its passage through the extruder. As the polymer and glass cool the strong and now solidified polymer prevents the fibre from contracting and the fibre therefore remains in tension. This effect is greater for sodium borosilicate glass due to its large $\alpha$. The expansion coefficient of the fibre material is therefore important in conjunction with this polymer.

For one sample, it was noted that the temperature sensitivity was extremely low, being reduced from approximately 38 ps $deg^{-1} km^{-1}$ for the bare fibre to near zero for the composite fibre structure, at a temperature around −20 deg C. In order to verify the large reduction in sensitivity to temperature and its application in sensors, a single-mode fibre Michelson interferometer was made with each arm approximately 30 metres of the coated fibre. (A single mode fibre Michelson interferometer is described, for example, in U.K. patent application Nos. 8305154 and 8306774 in the name of the present Applicants.) One arm was placed in a stable temperature environment at room temperature while the other was temperature ramped around −25 degree C. A fringe count was made at the output of the interferometer in order to compare it with the bare fibre subjected to a similar temperature ramping.

Figure 2:
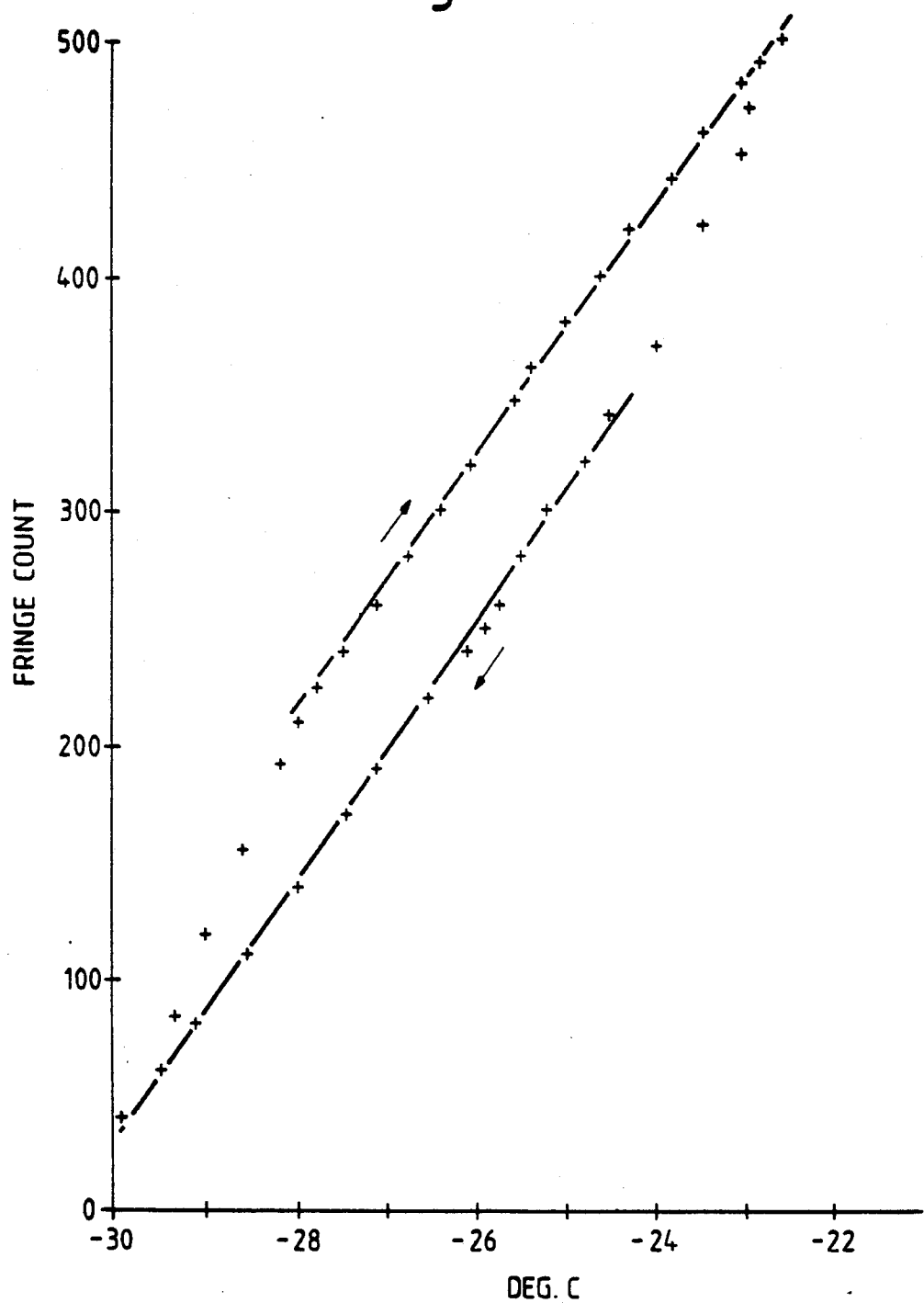
FIG. 2 is a graphical representation of the relationship between temperature and transmission delay, as measured by an interferometric method, of an optical fibre coated in accordance with the present invention.

The sensitivity of the bare fibre has been measured to be approximately 8.33 fringes $C^{-1} m^{-1}$ (16.66$\pi$ rads $C^{-1} m^{-1}$). A measurement of fringe count for the coated fibre revealed an average of 0.92 fringes $C^{-1} m^{-1}$ (1.84$\pi$ rads $C^{-1} m^{-1}$). This represents a reduction in sensitivity to approximately 10% of the bare fibre value. The measured fringe count data as a function of temperature is plotted in FIG. 2, where the hysteresis is thought to be due to the temperature difference between the thermocouple used to measure the temperature and the actual temperature distribution along the whole length of the coated fibre. As can be seen from the figure, the slope in both directions is similar approximately 2 degrees after the start of the measurement in each direction of the temperature excursion.

The sensitivity of the coated fibre to temperature changes may be further reduced by changing the melt and extrusion conditions which in turn alters the expansion coefficient of the material. With the correct expansivity of the coating material, it should be possible to minimize the sensitivity of transmission delay of the fibre to temperature fluctuations over a larger useable temperature range. It should also be possible to reduce acoustic sensitivity of the coated fibre by extruding low compliance materials. This would allow the manufacture of sensors to be built for specific applications. Measurement has revealed the sensitivity to have been reduced to approximately 10% of a bare silica fibre. By altering the extrusion conditions further reductions in sensitivity to temperature changes are envisaged. Optical fibres coated in accordance with the invention are expected to be useful in sensor applications. Also they would, for example, for the first time allow the construction of highly stable devices such as fibre external cavity single-mode lasers.

TABLE 1

| | FIBRE | POLYMER |
|---|---|---|
| DIAMETER | 125 $\mu m$ | 900 $\mu m$ |
| PRIMARY COATING | 250 $\mu m$ | — |
| COEFF. OF EXPN. | $+5*10^{-7}$ | $-3.7*10^{-6}$ |
| | | (Room temp. data) |
| YOUNG'S MODULUS | 72$GNm^{-2}$ | 21$GNm^{-2}$ |

Figure 3:
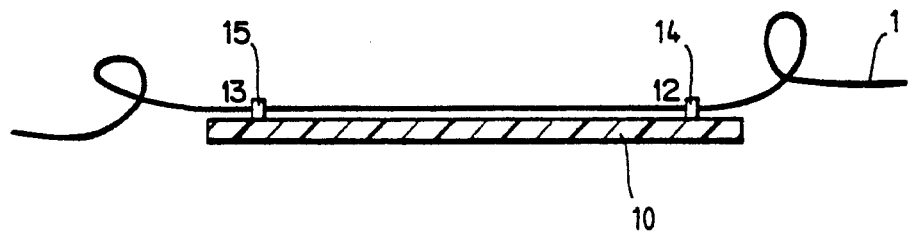
FIGS. 3 to 5 illustrate further embodiments of the present invention.
Figure 4:
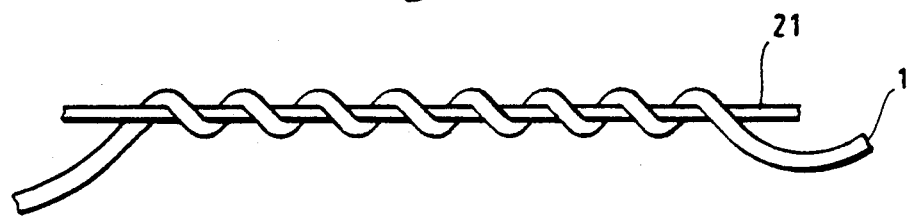
Figure 5:
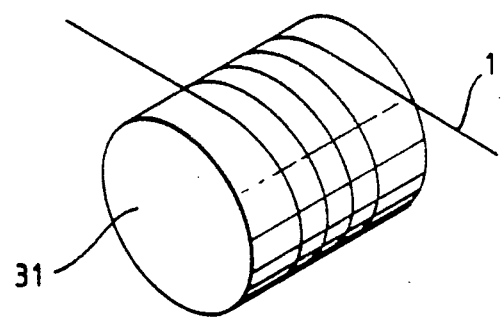

Referring now to FIGS. 3 to 5, there are illustrated alternative embodiments of the present invention.

In FIG. 3, the stressing means for the optical fibre 1 are provided by a rigid polymer based substrate 10. The fibre 1 is attached thereto by clamps 14 and 15, at spaced positions 12 and 13 which may be of a releasable type such as screw clamps. Alternatively instead of releasable clamps an adhesive compound may be employed to attach the fibre to the substrate, either directly or indirectly via mounting blocks (not shown). In the arrangement of FIG. 3, the fibre 1 must be prestressed before attachment to the substrate 10 sufficiently to ensure that the tension in the fibre is not released through thermal dimension changes in the substrate over the intended range of operating temperatures.

It will be appreciated that in the example of FIG. 3, the optical fibre could readily be replaced by an optical planar waveguide structure, e.g. a LiNbO$_3$ thin film waveguide structure, which then would preferably be attached to the substrate over its whole length. However, in view of the rigidity of such waveguide structures, prestressing would not normally be necessary.

In FIG. 4 there is shown an arrangement in which the fibre 1 is wound about a polymer strength member 21 having the desired thermal expansion properties as discussed above. The fibre 1 is again pre-stressed. This ensures intimate contact between the fibre and the strength member 21 so that any variations, primarily in length but also in diameter, of the strength member 21 cause a corresponding change in strain in the fibre 1.

In FIG. 5 the fibre 1 is shown wound around a drum 31 of polymer having the appropriate thermal properties as previously discussed. It will be readily understood that any change, primarily in diameter but also axially, of the drum will cause a change in the strain in the fibre 1.

I claim:

1. A method of reducing temperature dependence of transmission delay dt/dT, where t is transmission delay and T is temperature, in an optical waveguide over a predetermined temperature range comprising: attaching the optical waveguide to a stressing means having a selected coefficient of linear thermal expansion $\alpha$ of opposite sign to that of the waveguide and being dimensioned to apply a temperature dependent stress $\sigma$ to substantially eliminate variations in optical path length in the waveguide due to temperature induced changes in length L and refractive index N of the waveguide over the predetermined temperature range.

2. A method as claimed in claim 1 comprising attaching the waveguide to stressing means having a negative coefficient of thermal linear expansion.

3. A method as claimed in claim 1 or 2 including attaching stressing means comprising a tightly fitting jacket around the waveguide with jacket parameters selected such that $$\alpha_j = (1 + K_w/K_j)\left[\frac{1dt}{tdT} + \frac{E}{N}w^{\alpha_w}\frac{dN}{d\sigma} - \frac{1dN}{NdT}\right]/\left(1 + \frac{E_w}{N}\frac{dN}{d\sigma}\right) - \frac{K_w}{K_j}\alpha_w$$

where $K_j = A_jE_j$ and $K_w = A_wE_w$, $\alpha$ is the coefficient of expansion, A is the cross-sectional area and E is Young's modulus, the subscripts j and w referring to jacket and waveguide parameters respectively, and where $$\frac{dt}{dT} = t\left[K + \frac{1dN}{NdT} + \frac{E_w}{N}\frac{dN}{d\sigma}(K - \alpha_w)\right]$$

and $$K = (A_jE_j\alpha_j + A_wE_w\alpha_w)/(A_jE_j + A_wE_w)$$

and the selection is determined in order that dt/dT is maintained substantially equal to zero throughout the predetermined temperature range.

4. A method as claimed in claim 3 including applying the jacket to a primary coating of an optical fibre.

5. A method as claimed in claim 4 in which the jacket material is extruded onto the optical fibre.

6. A method as claimed in claim 1 or 2, including attaching the waveguide to a stressing means formed of an oriented polymer.

7. A method as claimed in claim 6 including forming the stressing means by extrusion of a liquid crystal polymer.

8. A method as claimed in claim 7 wherein at least one of the elastic modulus and the coefficient of linear thermal expansion of the extruded material are at least partly determined by the extrusion conditions.

9. A method as claimed in claim 1 or 2 including prestressing the waveguide and attaching the stressing means to the prestressed waveguide.

10. A method as claimed in claim 1 or 2 wherein the attachment is at least primarily through frictional contact.

11. An optical waveguide assembly comprising: an optical waveguide, stressing means attached to said optical waveguide, said stressing means having a selected coefficient of thermal linear expansion $\alpha$ of opposite sign to that of the waveguide and being dimensioned to apply a temperature dependent stress $\sigma$ to the waveguide to substantially eliminate variations in optical path length in the waveguide due to temperature induced changes in length L and refractive index N of the waveguide, thereby to reduce temperature dependence of transmission delay dt/dT, where t is transmission delay and T is temperature in the optical waveguide over a predetermined temperature range.

12. An assembly as claimed in claim 11, wherein the stressing means have a negative coefficient of linear thermal expansion.

13. An assembly as claimed in claim 11 or 12 wherein the waveguide is attached to the stressing means at discrete spaced positions.

14. An assembly as claimed in claim 11 or 12 wherein the waveguide is prestressed and attached to the stressing means in prestressed condition.

15. An assembly as claimed in claim 11 or 12 wherein the stressing means is formed of an oriented polymer.

16. An assembly as claimed in claim 15, wherein the stressing means is formed of a liquid crystal polymer.

17. An assembly as claimed in claim 11 or 12, wherein the waveguide comprises an optical fibre.

18. An assembly as claimed in claim 17, wherein the stressing means comprise a cylindrical member and the optical fibre is wound around the cylindrical member.

19. An assembly as claimed in claim 17, wherein the stressing means comprise a sleeve member around the fibre.

20. An optical fibre having at least part of its length enclosed in a tightly fitting jacket having a selected coefficient of thermal linear expansion $\alpha$ of opposite sign to the coefficient of thermal linear expansion of the optical fibre and being dimensioned to apply a temperature dependent stress $\sigma$ to the fibre to substantially eliminate variations in optical path length in the fibre due to temperature induced changes in length L and refractive index N of the fibre thereby to reduce temperature dependence of transmission delay dt/dT, where t is transmission delay and T is temperature, in the optical fibre over a predetermined temperature range.

21. An optical fibre according to claim 20 wherein jacket parameters are selected such that $$\alpha j = (1 + K_f/K_j) \left[ \frac{1dt}{tdT} + \frac{E_f}{N} \alpha_f \frac{dN}{d\sigma} - \frac{1dN}{NdT} \right] / \left( 1 + \frac{E_f}{N} \frac{dN}{d\sigma} \right) - \frac{K_f}{K_j} \alpha_f$$

where $K_j = A_j E_j$ and $K_f = A_f E_f$, $\alpha$ is the coefficient of expansion, A is the cross-sectional area and E is Young's modulus, the subscripts j and f referring to jacket and fibre parameters respectively, and where $$\frac{dt}{dT} = t \left[ K + \frac{1dN}{NdT} + \frac{E_f}{N} \frac{dN}{d\sigma} (K - \alpha_f) \right]$$

and $$K = (A_j E_j \alpha_j + A_f E_f \alpha_f)/(A_j E_j + A_f E_f)$$

and the selection is determined in order that dt/dT is maintained substantially equal to zero throughout the predetermined temperature range.

22. An optical fibre as claimed in claim 20 or 21 wherein the jacket has a negative coefficient of thermal linear expansion.

23. An optical fibre as claimed in claim 20 or 21, wherein the jacket comprises an oriented polymer.

24. An optical fibre as claimed in claim 23, wherein the polymer is a thermotropic liquid crystalline polymer.

25. A coated optical fibre as claimed in claim 20 or 21 wherein the jacket is a coating material applied to a primary coating of the optical fibre.

26. An optical fibre as claimed in claim 20 or 21, wherein the jacket material has a coefficient of thermal linear expansion on the order of $-5 \times 10^{-6}$.

27. An optical fibre as claimed in claim 20 or 21, wherein the optical fibre is a monomode silica optical fibre.

28. An optical fibre as claimed in claim 20 or 21, wherein the jacket material has an elastic modulus on the order of 20 $GNm^{-2}$.

29. An optical fibre assembly in which two or more optical fibres as claimed in claim 20 or 21 have a common coating.

* * * * *